Aug. 18, 1964   A. H. ROLOSON   3,144,928
CONVEYING APPARATUS FOR LOADING SHIPS
Filed Oct. 11, 1961   3 Sheets-Sheet 1
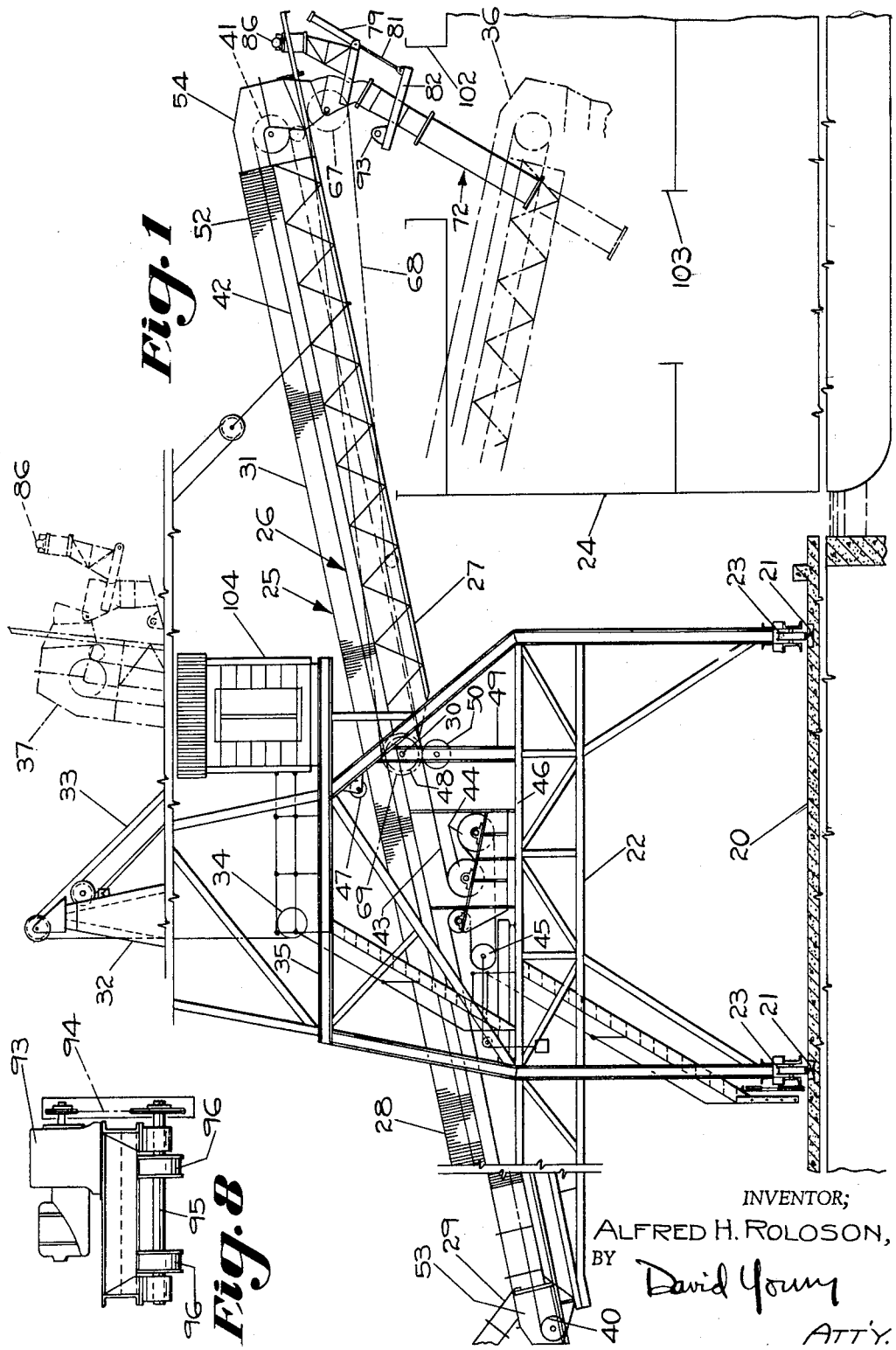
INVENTOR;
ALFRED H. ROLOSON,
BY David Young
ATT'Y.

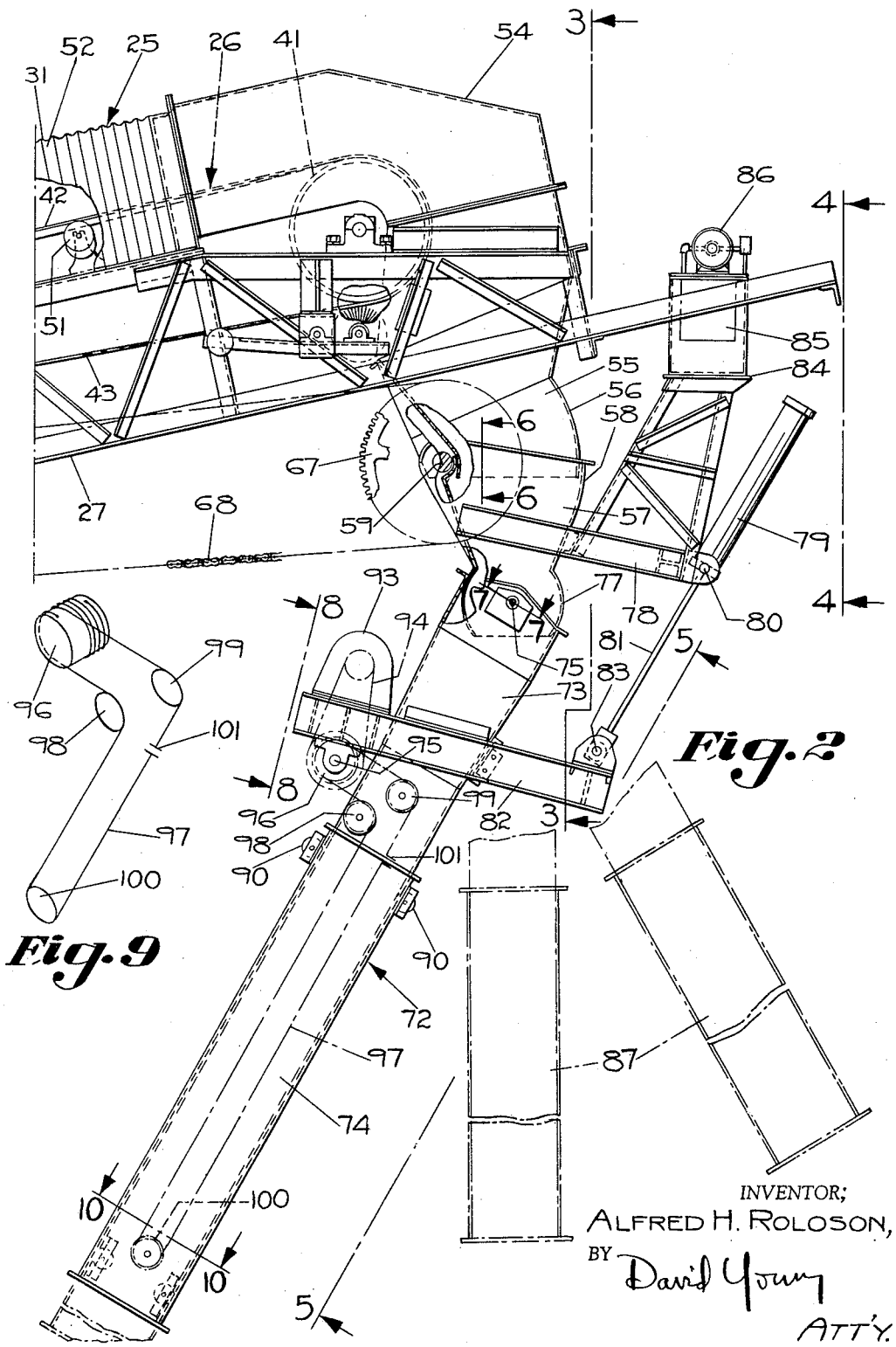

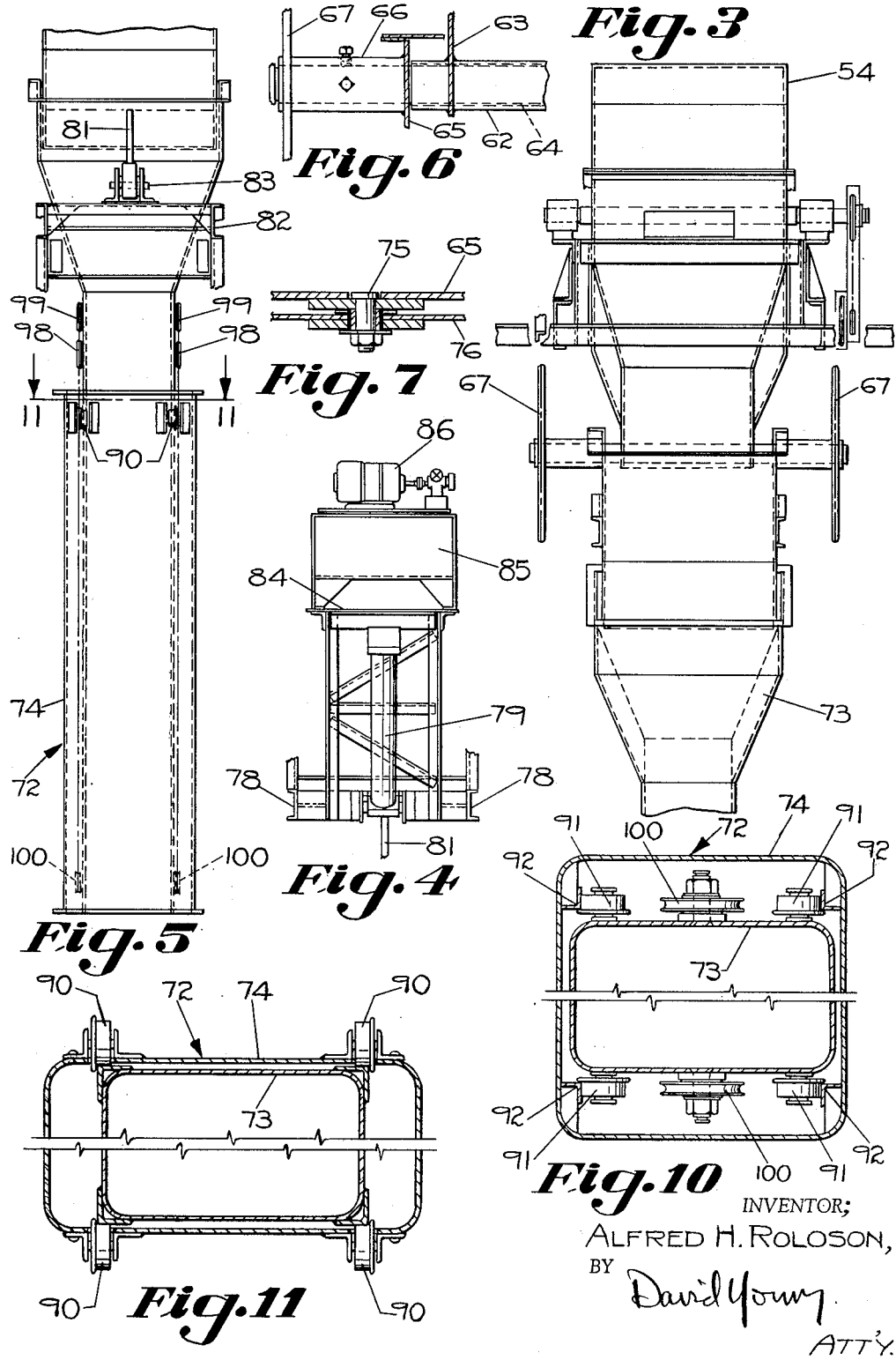

United States Patent Office 3,144,928
Patented Aug. 18, 1964

3,144,928
CONVEYING APPARATUS FOR LOADING SHIPS
Alfred H. Roloson, Worthington, Ohio, assignor, by mesne assignments, to Jeffrey Galion Manufacturing Company, a corporation of Ohio
Filed Oct. 11, 1961, Ser. No. 144,473
1 Claim. (Cl. 198—72)

The instant invention relates to conveying apparatus particularly suited for loading ships at dockside.

For the purpose of loading ships at dockside it is customary to provide conveying apparatus on the dock for moving the material to the ship and loading it into the ship's holds. A customary arrangement for accomplishing this purpose is to have a conveyor, which may be of the belt type, extending the length of the dock and generally paralleling the ship which is tied up at the dock. The belt conveyor is provided with a belt tripper device for the purpose of discharging material from the belt conveyor at any selected point along the length thereof. Also mounted on the dock, there is provided conveying apparatus which is disposed between the aforementioned belt conveyor and the ship, this latter conveying apparatus receiving the material discharged by the belt tripper and delivering the same to the ship and loading the material in the ship's holds. The conveying apparatus is usually supported on the dock on rails to permit it to travel along the length of the dock in a line between and paralleling the belt conveyor and the ship, to receive material from the belt conveyor at any point along the length thereof and to discharge the material into any of the holds of the ship.

The conveying apparatus for loading the ship's holds should be adjustable, first, for the purpose of properly positioning the conveying apparatus with respect to the position of the ship. The position of the ship at the dock is affected by several factors, one of which is the level of the water at the dock which, of course, affects the vertical position of the ship, and another factor is the load carried by the ship, also affecting the vertical position thereof in the water. Depending on these factors the ship may float higher or lower in the water, requiring adjustment of the position of the conveying apparatus to properly meet the ship. It will be understood that during the operation of loading the ship, the latter will float progressively lower in the water, requiring progressive adjustment of the position of the conveying apparatus during the loading operation.

A further reason for providing adjustment of the various elements of the conveying apparatus is for the purpose of reaching the several holds of the ship. Thus, it may be desired to reach through a hatch opening in the upper deck of the ship to a hatch opening in a between deck of the ship, to load material into a lower hold. It is further desired that after reaching a particular hold of a ship, the conveying apparatus further be adjustable to distribute the material delivered to the hold of the ship, which is to say that during the loading operation the position of the discharging element of the conveyor be adjusted so as to deliver the material at a plurality of locations, to thereby distribute the material in the hold.

Accordingly, it is an object of the instant invention to provide an improved conveying apparatus for loading ships adapted to serve the purposes hereinabove described.

It is a further object of the instant invention to provide an improved conveying apparatus for loading ships, in which the several elements of the conveying apparatus are adjustable to properly meet the ship in the various positions thereof.

It is another object of the instant invention to provide an improved conveying apparatus for loading ships, in which the discharge elements of the conveyor are adjustable to distribute the material in the ship's holds.

It is also an object of the instant invention to provide an improved conveying apparatus for loading ships, in which certain elements of the conveying apparatus are adjustable for the purpose of reaching different sections of the ship for loading the material therein.

Still another object of the instant invention is to provide an improved conveying apparatus particularly suited for loading ships, in which the material is discharged through an intermediate chute, which is always maintained in a substantially fixed upright position in all positions of adjustment of other elements of the conveying apparatus.

A still further object of the instant invention is to provide a conveying apparatus particularly adapted for loading ships, in which the material is delivered to an intermediate chute which is always maintained in a substantially upright position, there being provided a discharge chute for receiving material from the intermediate chute and discharging the same into the ship. The discharge chute is adjustably mounted on the intermediate chute and there is provided means for adjusting the position of the discharge chute, said adjusting means being supported on the intermediate chute, whereby the adjustment of the discharge chute is always with respect to a fixed reference.

Other objects of the invention will appear hereinafter, the novel features and combinations being set forth in the appended claim.

In the drawings:

FIG. 1 illustrates a conveying apparatus for loading ships, constructed in accordance with the instant invention;

FIG. 2 is an enlarged view of the head end of the conveying apparatus and showing the several chutes thereof;

FIG. 3 is a view of the head end of the conveying apparatus, taken along the line 3—3 in FIG. 2;

FIG. 4 is a view of the head end of the conveying apparatus, taken along the line 4—4 in FIG. 2;

FIG. 5 is a view of the intermediate chute and the discharge chute, taken along the line 5—5 in FIG. 2;

FIG. 6 is a partial sectional view of the pivot connection between the intermediate chute and the conveyor chute, taken on the line 6—6 in FIG. 2;

FIG. 7 is a sectional view of the pivotal connection of the discharge chute to the intermediate chute, taken on the line 7—7 in FIG. 2;

FIG. 8 is a view of the winch for extending and retracting the discharge chute, taken on the line 8—8 in FIG. 2;

FIG. 9 is a diagrammatic illustration of the cable drive for extending and retracting the discharge chute;

FIG. 10 is a sectional view of the discharge chute, taken on the line 10—10 in FIG. 2; and FIG. 11 is a sectional view of the discharge chute, taken on the line 11—11 in FIG. 5.

Referring to the drawings, there is illustrated in FIG. 1 the general arrangement of a conveying apparatus constructed in accordance with the instant invention. The dock 20 is provided with rails 21 extending the length of the dock. A gantry 22 is supported on a plurality of wheels 23 disposed at the base thereof, which ride along the rails 21 for transportation of the gantry 22 to any position along the dock 20. The conveying apparatus constructed in accordance with the instant invention is supported on the gantry 22 and is thereby moved to any selected position along the dock for loading material into a ship 24, which is tied up at the dock 20, as diagrammatically represented in FIG. 1.

The conveying apparatus comprises a main conveying means 25, which may take the form of an endless belt conveyor 26 having a suitable framework 27, by which it is supported on the gantry 22. The belt conveyor 26 has a tail portion 28 which extends to the rear of the gantry 22. The material to be conveyed is loaded on the belt conveyor 26 through a chute 29 that discharges the material to the conveyor tail portion 28. The chute 29 is included as an element of a belt tripper that rides along a main belt conveyor extending the length of the dock 20. The belt tripper and the belt conveyor with which it is associated are not illustrated herein, since these do not form any part of the instant invention and may be constructed in any suitable manner as known in the art.

The tail portion 28 of the endless belt conveyor 26 extends to a hinge axis 30 located on the gantry 22. A head portion 31 of the belt conveyor 26 extends forwardly from the hinge axis 30 in the form of a boom. The conveyor tail portion 28 is fixed with respect to the gantry 22, and the conveyor head portion 31 is adjustable relatively to the gantry 22 by swinging movement of the conveyor head portion 31 in an upright plane about the hinge axis 30.

The gantry 22 is formed with a tower 32, from which there extends a cable system 33 that connects to the conveyor head portion 31 for raising and lowering the latter by swinging it about the hinge axis 30. The cable system 33 is connected to a winch 34 supported on an upper deck 35 of the gantry 22. The winch 34 supplies the power for paying out and reeling in the cable of the cable system 33, for lowering and raising, respectively, the conveyor head portion 31.

It is contemplated that the highest position of the conveyor head portion 31, during conveying operation of the endless belt conveyor 26, be as illustrated in FIG. 1, in which the conveyor head portion 31 is aligned with the conveyor tail portion 28. By paying out the cables of the cable system 33 the conveyor head portion 31 may be swung downwardly to its lowest position 36, as illustrated in phantom lines in FIG. 1. The position at which the conveyor head portion 31 is set is determined by the height at which the ship 24 rides adjacent the dock 20. For the purpose of storage, the conveyor head portion 31 may be swung upwardly to a completely retracted position 37, as illustrated in phantom lines in FIG. 1. In the stored position the conveyor head portion 31 and its accessory devices, which will be described in greater detail hereinafter, are withdrawn to substantially within the limits of the dock 20 so as to be completely out of the way of the ship 24 to permit free passage of the latter. The cable system 33 is utilized for raising the conveyor head portion 31 to its stored position.

The main conveying means 25 comprises a tail pulley 40 and a head pulley 41, about which the endless belt conveyor 26 is trained in a conveying run 42 and a return run 43. Between the tail pulley 40 and the head pulley 41, the return run 43 is reeved over drive pulleys 44, by which the endless belt conveyor 26 is driven, and a weighted take-up pulley 45 by which tension is maintained in the endless belt conveyor 26. The drive pulleys 44, the take-up pulley 45 and the associated mechanism for supplying power for driving the belt conveyor 26 are supported on a lower deck 46 of the gantry 22.

The hinge axis 30 is disposed between the conveying run 42 and the return run 43 of the belt conveyor 26. Thus, when the conveyor head portion 31 is swung upwardly, the shortening of the conveying run 42 will be substantially compensated for by the lengthening of the return run 43, and similarly, when the conveyor head portion 31 is swung downwardly the shortening of the return run 43 will be substantially compensated for by the lengthening of the conveying run 42. Any slack that may occur is taken up by the take-up pulley 45. When the conveyor head portion 31 is swung upwardly to the stored position 37 the conveying run 42 comes into contact with an idler pulley 47 to prevent collapsing of the conveying run 42. An idler pulley 48 is rotatably supported on upright frame members 49 of the gantry 22 for rotation about the hinge axis 30. The conveying run 42 is disposed in contact with the idler pulley 48. Another idler pulley 50 is rotatably mounted on the upright frame members 49 below the return run 43, and the latter rides on the pulley 50. When the conveyor head portion 31 is lowered, for example, to the low position 36, the conveying run 42 and the return run 43 are constrained by the idler pulleys 48, 50, respectively, and bend about these pulleys to maintain the endless belt conveyor 26 in operative condition in all adjusted positions of the conveyor head portion 31.

The endless belt conveyor 26 is provided with a plurality of troughing idlers 51, one of which is illustrated in FIG. 2, and which are supported on the framework 27 along the length of the conveying run 42 to maintain the latter in troughed condition to prevent the material from falling off the belt. There is additionally provided a flexible cover 52 extending along the major portion of the length of the main conveying means 25, to provide protection in inclement weather for the material being conveyed. At the tail end of the main conveying means 25 there is provided a rigid cover 53, and similarly, at the head end there is provided a rigid cover 54, thereby affording complete coverage of the main conveying means 25 along its full length.

The material discharges from the endless belt conveyor 26 over the head pulley 41 and into a receiving chute 55 which is disposed below the head end cover 52 at the discharge position of the endless belt conveyor 26. The receiving chute 55 may be formed as illustrated in FIG. 2, as a depending extension from the head end cover 54, the receiving chute 55 being rigid with the main conveying means 25. The lower section 56 of the receiving chute 55 has a curved form to be mated with an intermediate chute 57 having an upper section 58 which is complementally curved with respect to the curved section 56.

The intermediate chute 57 is secured to the receiving chute 55 on a pivot axis 59, whereby the intermediate chute 57 may be swung upwardly and downwardly about the pivot axis 59 and with respect to the receiving chute 55 for adjustment of the intermediate chute 57 with respect to the receiving chute 55 and, of course, with respect to the main conveying means 25. The intermediate chute 57 provides a depending extension of the receiving chute 55, which may be adjusted, as will be described.

Referring to FIG. 6, there is illustrated therein the pivotal connection of the intermediate chute 57 to the receiving chute 55, it being understood that FIG. 6 shows the details of the pivotal connection at one side only, and that the connection, as illustrated, is duplicated at the other side of the chutes 55, 57. A tube 62 is secured to the opposite side walls 63 of the receiving chute 55. A shaft 64 extends through the tube 62 and is rotatably supported therein. The shaft 64 extends beyond the opposite side walls 65 of the intermediate chute 57. A collar 66 is rigidly secured to each side wall 65 of the intermediate chute 57 and extends laterally therefrom to receive a projecting end of the shaft 64. The shaft 64 and the collars 66 are fixedly secured to each other by any suitable means, such as bolts or keys, whereby the intermediate chute is supported by the shaft 64 on the receiving chute 55 for swinging movement relatively thereto about the pivot axis 59.

A sprocket wheel 67 is fixedly secured to each collar 66 at opposite sides of the intermediate chute 57 for applying force to adjust the position of the intermediate chute 57 relatively to the receiving chute 55. By rotation of the sprocket wheels 67, the collars 66 and the shaft 64 are rotated, thereby producing swinging movement of the intermediate chute 57. An endless chain 68, or like flexible motion transmission means, is trained about each sprocket wheel 67. Another pair of sprocket wheels 69 is supported on the upright frame members 49 of the gantry 22. The sprocket wheels 69 are fixed on the upright frame members 49 and are disposed on the hinge axis 30. The endless chains 68 are trained about the fixed sprocket wheels 69. Thus, when the conveyor head portion 31 is raised or lowered, the endless chains 68 will produce rotation of the sprocket wheels 67 and adjust the position of the intermediate chute 57 relatively to the receiving chute 55.

The position of the intermediate chute 57 is established as being substantially upright or plumb, and since the sprocket wheels 67, 69 are of the same diameter, the substantially upright or plumb position of the intermediate chute 57 will be maintained fixed in all positions of adjustment of the conveyor head portion 31. Thus, the adjustment of the intermediate chute 57 is with respect to the receiving chute 55 and the main conveying means 25, of which the receiving chute 55 is a fixed part. The adjustment of the intermediate chute 57 is automatically responsive to the adjustment of the conveyor head portion 31, by virtue of the connections of the intermediate chute 57 to the main conveying means 25 and to the sprocket wheels 69, the latter being fixed to the gantry 22. In all operative adjusted positions of the conveyor head portion 31, the intermediate chute 57 is maintained in a substantially upright or plumb position to provide a fixed reference, as will be described hereinafter. When the conveyor head portion 31 is moved to the stored position 37, the position of the intermediate chute 57 is automatically adjusted in the same manner as described, to move the intermediate chute 57 in towards the conveyor head portion 31, as seen in phantom lines in FIG. 1, thereby automatically moving the intermediate chute 57 and the various elements associated therewith to a stored position.

A discharge chute 72 is secured to the lower end of the intermediate chute 57 and extends downwardly therefrom. The discharge chute 72 includes an upper chute portion 73 and a lower chute portion 74, with the lower chute portion 74 being telescoped over the upper chute portion 73, whereby the discharge chute 72 may be extended or retracted. The discharge chute 72 is secured to the intermediate chute 57 by a pair of pivot pins 75 disposed one at either side thereof. As best seen in FIG. 7, each pivot pin 75 is fixedly secured to a side wall 65 of the intermediate chute 57 and extends through a side wall 76 of the upper chute section 73 to provide a pivotal support for swinging movement of the discharge chute 72 about the axis of the pivot pins 75. The lower part 77 of the intermediate chute 57 is formed as a portion of a cylinder having its axis coincident with the axis of the pivot pins 75, and the upper end of the upper chute section 73 is mated with the intermediate chute lower part 77 to swing on the latter and relatively thereto about the axis of the pivot pin 75.

A cantilever beam structure 78 extends laterally from the intermediate chute 57 and is secured thereto. At the outer end of the beam structure 78 there is secured a hydraulic cylinder and piston mechanism 79, by which the position of the discharge chute 72 is adjusted relatively to the intermediate chute 57. The cylinder and piston mechanism 79 is pivotally secured to the beam structure 78 by pivot means 80. The piston rod 81 extends downwardly from the cylinder and piston mechanism 79 to a beam structure 82 extending laterally from the discharge chute 72 and secured to the upper section 73 thereof. The piston rod 81 is pivotally connected to the beam structure 82 by a pivot 83. The hydraulic cylinder and piston mechanism 79 is double acting, whereby the opposite movements of the piston rod 81 swing the discharge chute 72 in opposite directions about the axis of the pivot pins 75 for adjustment of the discharge chute 72. As seen in FIG. 2, the discharge chute 72 is in a maximum position of clockwise adjustment and the piston rod 81 is fully extended. By retraction of the piston rod 81 the discharge chute 72 may be moved to its maximum position of counterclockwise adjustment in the opposite direction. Since the intermediate chute lower part 77 is formed as a portion of a cylinder, as above described, there is effectively provided a swivel joint between the intermediate chute 57 and the discharge chute 72, permitting swinging movement of the discharge chute 72 in opposite directions.

A platform 84 is secured to the beam structure 78 and is supported thereby. On the platform there is provided a reservoir tank 85 for hydraulic fluid to be supplied to the cylinder and piston mechanism 79. As best seen in FIG. 4, on top of the tank 85 there is mounted a motor pump set 86 for delivering hydraulic fluid under pressure to the cylinder and piston mechanism 79 for operation of the latter, as described. A suitable hydraulic system including appropriate controls is provided for operation of the cylinder and piston mechanism 79 in opposite directions.

As previously described, in all positions of adjustment of the main conveying means 25 the upright or plumb position of the intermediate chute 57 is maintained fixed. Thus, there is provided a fixed reference, with respect to which the discharge chute 72 may be adjusted. The operating elements for adjustment of the discharge chute 72, which include the cylinder and piston mechanism 79, are supported on the intermediate chute 57 so that the orientation of these devices remains fixed, as does the intermediate chute 57. Thus the discharge chute 72 may be adjusted in its position, without regard to the adjusted position of the main conveying means 25. A given stroke of the piston rod 81 of the hydraulic cylinder and piston mechanism 79 will always produce adjustment of the discharge chute 72 through the same angle, since the latter is always adjusted with respect to a fixed reference, which is that of the intermediate chute 57. Several adjusted positions 87 of the discharge chute 72 are illustrated in phantom lines in FIG. 2.

Four rollers 90 are rotatably supported on the lower discharge chute section 74 at the upper end thereof. The four rollers 90 extend through the wall of the lower chute section 74 to engage the four corners of the upper chute section 73 and to ride along the same for guiding the movement of the lower chute section 74 with respect to the upper chute section 73. Another set of four rollers 91 are rotatably mounted on the lower end of the upper chute section 73 to engage four rails 92 secured to the inside of the lower chute section 72. The rails 92 ride along the rollers 91 and also guide the telescoping movement of the lower chute section 74 relatively to the upper chute section 73.

A power operated system is provided for extending and retracting the discharge chute 72. On the beam structure 82, at the opposite side of the discharge chute 72 from the piston rod 81, there is provided a motor reducer set 93 secured to the beam structure 82. The motor reducer set 93 provides a drive through chain and sprockets 94 to a shaft 95 rotatably supported on the underside of the beam structure 82. A pair of laterally spaced winch drums 96 are fixedly secured to the shaft 95 to be driven thereby. A flexible cable 97 is provided for each winch drum 96, and has its opposite ends secured to a winch drum 96. The cable 97 has one run thereof trained about a direction changing sheave 98 and another run thereof trained about a direction changing sheave 99. The sheaves 98, 99 are rotatably supported on the upper chute section 73, and one set thereof is provided at each side of the chute section 73 to operate with the cables 97 at opposite sides. The bight of the cable 97 is trained about a sheave 100 rotatably mounted on the upper chute section 73 near the lower end thereof, as best seen in FIGS. 2 and 10. At an intermediate point 101 in the cable 97 the latter is securely tied or clamped in any suitable manner to the lower chute section 74. The cable system is diagrammatically illustrated in FIG. 9, wherein it is seen that the opposite ends of a cable 97 are wound on a drum 96 in opposite directions. Thus, as viewed in FIG. 9, upon rotation of the winch drum 96 in a clockwise direction the lower chute section 74 will be lowered on the upper chute section 73, thereby extending the discharge chute 72. The lower chute section 74 is raised, for retraction of the discharge chute 72, by rotation of the winch drum 96 in a counterclockwise direction, as viewed in FIGS. 2 and 9. The motor reducer set 93 is provided with suitable controls for reversing the direction of operation thereof to rotate the shaft 95 and the winch drums 96 in opposite directions, as may be desired.

In operation of the conveying apparatus embodying the instant invention, the main conveying means 25 is positioned to extend over the side of the ship 24, with the discharge chute 72 extending into the hold of the ship. The position of the discharge chute 72 with respect to the intermediate chute 57 is appropriately adjusted in accordance with the location of the hatch openings 102, 103 in the ship 24. When it is desired to reach a between deck hatch opening 103 for loading material into the lower hold of the ship 24, the reach of the discharge chute 72 is increased by extending the lower chute section 74, as has been described hereinabove.

On the upper deck 35 of the gantry 22 there is provided a control house 104, in which there are provided controls connected to the various operating devices of the conveying apparatus. The control house 104 is positioned at the ship's side of the gantry 22, and the operator takes a position therein facing the ship so that he has a clear view of the conveyor head portion 31, including the intermediate chute 57 and the discharge chute 72. In the course of loading a ship 24, the position of the discharge chute 72 must be adjusted from time to time, to load material through the several hatch openings of the ship, as well as for distributing the material that is loaded into the ship through a given hatch opening. Since the discharge chute is always adjusted with respect to a fixed reference, namely, the intermediate chute 57, the adjustment of the discharge chute 72 is greatly facilitated, and permits the operator in the control house 104 to make predetermined adjustment of the discharge chute 72.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

Conveying apparatus comprising conveying means for moving material to a discharge position at which the material is discharged, a guiding chute at said discharge position for guiding the discharge of material from the conveying means, means fixedly securing the guiding chute to the conveying means, pivot means connecting the conveying means to the supporting structure for swinging movement of the conveying means relatively to the supporting structure for adjusting the position of said conveying means, an intermediate chute for receiving material discharged from said conveying means through the guiding chute at the discharge position, transverse pivot means for connecting said intermediate chute to the guiding chute for swinging movement of the intermediate chute relatively to the guiding chute and the conveying means for adjustment of the position of said intermediate chute relatively to the conveying means, said pivot means comprising a transverse shaft fixedly connected to said intermediate chute, means rotatably supporting said transverse shaft on the guiding chute at one side thereof, the opposite side of said guiding chute being formed with an arcuate portion having the axis of said shaft as its center, said intermediate chute mating with the guiding chute and having an arcuate portion with the axis of said shaft as its center and being complementally formed with respect to the arcuate portion of the guiding chute, said intermediate chute being disposed in a substantially upright position, a wheel secured to each end of said transverse shaft at opposite sides of the intermediate chute for swinging of the intermediate chute relatively to the guiding chute and the conveying means to maintain the upright position of the intermediate chute substantially fixed, a pair of fixed wheels disposed on the axis of the pivot means which connects the conveying means to the supporting structure, flexible motion transmission means trained on the fixed wheels and on the first said wheels to rotate the first said wheels in response to adjustment of the position of the conveying means to thereby adjust the position of the intermediate chute relatively to the guiding chute and the conveying means, a discharge chute depending from the intermediate chute for receiving material therefrom, pivot means disposed intermediate opposite sides of the intermediate chute, and means mounting the discharge chute on said pivot means for swinging movement of said discharge chute to opposite sides of the intermediate chute, the lower portion of said intermediate chute having opposite sides thereof formed as portions of a cylinder about the axis of said pivot means, and the discharge chute mating with such cylindrical portion of the intermediate chute to form a connection therewith in all adjusted positions of the discharge chute, adjusting means for the discharge chute including a hydraulic cylinder and piston device, means pivotally connecting the piston end of said hydraulic device to the discharge chute, means pivotally connecting the cylinder to the intermediate chute and by extension and retraction of the piston rod relatively to the hydraulic cylinder the discharge chute is swung from one side to the other side of the intermediate chute, and said discharge chute including telescopic chute sections and means for extending one of said chute sections relatively to the other of said chute sections for increasing the reach of said discharge chute.

References Cited in the file of this patent
UNITED STATES PATENTS

| | | |
|---|---|---|
| 1,633,627 | First | June 28, 1927 |
| 2,857,041 | Preston | Oct. 21, 1958 |
| 2,919,560 | Beemer | Jan. 5, 1960 |